United States Patent
Kang et al.

(10) Patent No.: US 11,847,746 B2
(45) Date of Patent: Dec. 19, 2023

(54) SERVER AND METHOD FOR GENERATING BEST VIEW SPOTS

(71) Applicant: Electronics and Telecommunications Research Institute, Daejeon (KR)

(72) Inventors: Kyung Kyu Kang, Daejeon (KR); Chang Joon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/540,517

(22) Filed: Dec. 2, 2021

(65) Prior Publication Data

US 2022/0180610 A1 Jun. 9, 2022

(30) Foreign Application Priority Data

Dec. 3, 2020 (KR) ........................ 10-2020-0167740

(51) Int. Cl.
| | |
|---|---|
| *G06T 19/00* | (2011.01) |
| *H04N 5/222* | (2006.01) |
| *G06T 7/73* | (2017.01) |
| *H04N 23/62* | (2023.01) |

(52) U.S. Cl.
CPC .............. *G06T 19/003* (2013.01); *G06T 7/73* (2017.01); *H04N 5/2224* (2013.01); *H04N 23/62* (2023.01)

(58) Field of Classification Search
CPC .......... H04N 23/62; G06T 7/73; G06T 19/003
See application file for complete search history.

(56) References Cited

U.S. PATENT DOCUMENTS

| | | | |
|---|---|---|---|
| 9,871,998 B1* | 1/2018 | Curlander | G06V 20/54 |
| 10,569,172 B2 | 2/2020 | Yee | |
| 10,839,557 B1* | 11/2020 | Arora | G06T 7/80 |
| 2012/0154439 A1 | 6/2012 | Ahn et al. | |
| 2015/0116360 A1* | 4/2015 | Jones | G06V 20/20 |
| | | | 345/629 |
| 2017/0193299 A1 | 7/2017 | Cho et al. | |
| 2018/0308274 A1* | 10/2018 | Molina | G06F 3/012 |
| 2020/0320797 A1* | 10/2020 | Hiranandani | G06Q 30/0641 |
| 2021/0097667 A1* | 4/2021 | Barua | G06T 7/97 |

FOREIGN PATENT DOCUMENTS

| | | |
|---|---|---|
| JP | 2020-534592 | 11/2020 |
| KR | 10-1459005 | 11/2014 |
| KR | 10-1682854 | 12/2016 |
| KR | 10-1996241 | 7/2019 |
| KR | 10-2166586 | 10/2020 |

\* cited by examiner

*Primary Examiner* — Phi Hoang
(74) *Attorney, Agent, or Firm* — KILE PARK REED & HOUTTEMAN PLLC

(57) ABSTRACT

Disclosed is a best view spot generating server which includes a virtual tour providing server that communicates with a user terminal over a network and generates a best view spot associated with a three-dimensional object included in a virtual space, and a database that operates in conjunction with the virtual tour providing server and stores data associated with the virtual space, data associated with the three-dimensional object, and data associated with the best view spot.

12 Claims, 6 Drawing Sheets

SERVER AND METHOD FOR GENERATING BEST VIEW SPOTS

CROSS-REFERENCE TO RELATED APPLICATIONS

This application claims priority under 35 U.S.C. § 119 to Korean Patent Application Nos. 10-2020-0167740 filed on Dec. 3, 2020, and 10-2021-0049237 filed on Apr. 15, 2021, in the Korean Intellectual Property Office, the disclosures of which are incorporated by reference herein in their entireties.

BACKGROUND

Embodiments of the present disclosure described herein relate to a computer graphics technology, and more particularly, relate to a service and a method for generating a best view spot associated with a three-dimensional object in a virtual space.

With the advent of the 5G era, immersive content that has emerged as a core technology is drawing attention again due to the occurrence of a global pandemic situation. As the unexpected untact era continues, the virtual reality technology is being used in various fields such as entertainment, education, media, and industry. In particular, as the pandemic situation continues for a long time, the interest in virtual tours using the virtual reality instead of overseas travel is increasing.

In the case of the existing virtual tour system, the user observed an object from a free point of view while freely moving in a three-dimensional virtual space. However, when the virtual tour is performed based on the user's control, it may be difficult to closely see the object to be observed due to clumsy manipulation or limitations of virtual reality. As such, there is a need for a technology capable of providing the best view spot in the virtual tour system such that characteristics of the object to be observed are provided more clearly. However, the number of best-view-spot candidates in a three-dimensional space may be infinite, and it is difficult to select the best view spot from numerous best-view-spot candidates.

SUMMARY

Embodiments of the present disclosure provide a server and a method for generating the best view spot associated with a three-dimensional object in a virtual space.

According to an embodiment, a best view spot generating server includes a virtual tour providing server that communicates with a user terminal over a network and generates a best view spot associated with a three-dimensional object included in a virtual space, and a database that operates in conjunction with the virtual tour providing server and stores data about the virtual space, data about the three-dimensional object, and data about the best view spot.

As an example, the best view spot is generated based on feature markers generated at feature portions of the three-dimensional object.

As an example, the virtual tour providing server forms a bounding hemi-sphere including the three-dimensional object, disposes sample spots on the bounding hemi-sphere, and determines best-view-spot candidates based on the number of feature markers, which are counted through each of virtual cameras disposed at the sample spots, from among the feature markers.

As an example, as the number of the feature markers counted through each of the virtual cameras disposed at the sample spots increases, the virtual tour providing server gives priorities of the best-view-spot candidates to the sample spots.

As an example, the virtual tour providing server provides the user terminal with a best view visualized with respect to the three-dimensional object, based on information about the best-view-spot candidates.

As an example, the virtual tour providing server provides the user terminal with a best view visualized with respect to the three-dimensional object, based on information about a best-view-spot candidate selected by a user from the best-view-spot candidates.

As an example, when the number of the feature markers counted through each of the virtual cameras disposed at the sample spots is a threshold value or more, the feature markers are included in the best-view-spot candidates.

According to an embodiment, a best view spot generating method of a system which provides a virtual tour associated with a virtual space including a three-dimensional object includes loading a three-dimensional object model, generating feature markers based on a feature of the three-dimensional object model, counting the number of feature markers viewed from each of a plurality of sample spots from among the feature markers, the plurality of sample spots being disposed on a bounding hemi-sphere disposed to include the three-dimensional object model, generating best-view-spot candidates based on the number of feature markers thus counted, and selecting a best view spot from the generated best-view-spot candidates.

As an example, the method further includes storing information about the generated best-view-spot candidates.

As an example, the plurality of sample spots are disposed on the bounding hemi-sphere at regular intervals.

As an example, the method further includes visualizing a best view associated with the three-dimensional object based on the selected best view spot.

As an example, the visualizing of the best view associated with the three-dimensional object includes loading information about the selected best view spot, checking whether a virtual camera operated by a user approaches a spot zone, and moving and rotating the virtual camera based on the information about the selected best view spot.

As an example, when the virtual camera approaches the spot zone, the system obtains an authority to control the virtual camera.

As an example, the method further includes returning the authority to control the virtual camera, after the movement and rotation of the virtual camera based on the information about the selected best view spot is completed.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
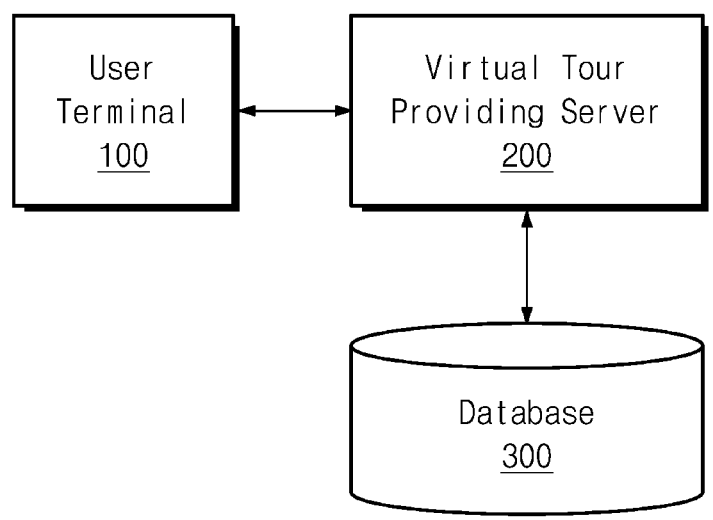
FIG. 1 is a diagram illustrating a best view spot generating system according to an embodiment of the present disclosure.

Below, embodiments of the present disclosure will be described in detail and clearly to such an extent that one skilled in the art easily carries out the present disclosure.

The terms used in the specification are provided to describe the embodiments, not to limit the present disclosure. As used in the specification, the singular terms "a," "an" and "the" are intended to include the plural forms as well, unless the context clearly indicates otherwise. The terms "comprises" and/or "comprising," when used in the specification, specify the presence of components, steps, operations, and/or elements, but do not preclude the presence or addition of one or more other components, steps, operations, and/or elements.

In the specification, the term "first and/or second" will be used to describe various elements but will be described only for the purpose of distinguishing one element from another element, not limiting an element of the corresponding term. For example, without departing from the scope and spirit of the present disclosure, a first element may be referred to as a second element, and similarly, a second element may be referred to as a first element.

Unless otherwise defined, all terms (including technical and scientific terms) used in the specification should have the same meaning as commonly understood by those skilled in the art to which the present disclosure pertains. Also, the terms that are defined in commonly used dictionaries should not be interpreted in an idealized or overly formal sense unless expressly so defined herein. The same reference numerals represent the same elements throughout the specification.

FIG. 1 is a diagram illustrating a best view spot generating system 10 according to an embodiment of the present disclosure. Referring to FIG. 1, the best view spot generating system 10 according to an embodiment of the present disclosure may include a user terminal 100, a virtual tour providing server 200, and a database 300. The virtual tour providing server 200 and the database 300 may constitute a best view spot generating server.

The user terminal 100 may be an electronic device capable of providing a virtual tour to the user. As an example, the user terminal 100 may be a communication device, which is capable of connecting to a network, such as a desktop computer, a laptop computer, a smartphone, a personal digital assistant (PDA), a portable multimedia player (PMP), a navigation terminal, and a tablet PC. The user terminal 100 may perform an access to the virtual tour providing server 200 for the purpose of providing the virtual tour to the user.

The virtual tour providing server 200 may provide the virtual tour to the user through the user terminal 100. The virtual tour providing server 200 may provide a three-dimensional virtual space to the user through the user terminal 100. An observation target (or object) implemented three-dimensionally may be included in the virtual space. As an example, the observation target may include a building, a sculpture, a natural object, and the like.

The virtual tour providing server 200 may generate best view spots associated with the observation target and may provide best-view-spot candidates to the user using the virtual tour. A best view spot refers to a location capable of easily observing a characteristic of an observation target in a virtual space. Also, the virtual tour providing server 200 may move a virtual camera to a best view spot generated without a separate control of the user. A best view visualized through the virtual camera moved to the best view spot may be provided to the user.

The database 300 may store data about a virtual space to be provided from the virtual tour providing server 200 to the user terminal 100, data about a three-dimensional observation target included in the virtual space, and data about a best view spot generated in the virtual tour providing server 200. The virtual tour providing server 200 may read data stored in the database 300 in conjunction with the database 300 so as to be provided to the user terminal 100 and may transfer data generated by the virtual tour providing server 200 to the database 300 so as to be stored therein.

In the virtual tour, the best view spot generating system 10 according to an embodiment of the present disclosure may generate a best view spot associated with a three-dimensional observation target in a virtual space and may provide the user with the virtual reality visualized based on the generated best view spot. The best view spot generating system 10 according to the present disclosure may provide the best view spot quickly compared to the case where the user directly controls a virtual camera. Also, the best view spot generating system 10 according to the present disclosure may provide the user with a best view of a three-dimensional observation target visualized at the best view spot without a separate control. A best view spot generating method of the best view spot generating system 10 according to the present disclosure and a visualization method using the same will be described in detail with reference to FIGS. 2 to 7.

Figure 2:
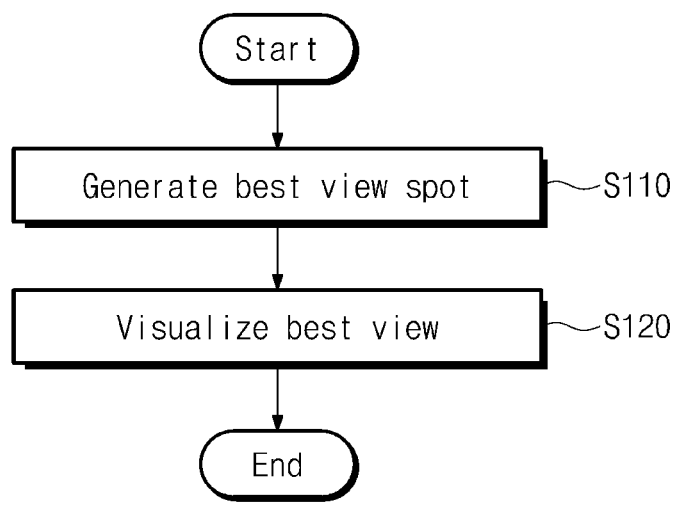
FIG. 2 is a flowchart for describing a best view spot providing method according to an embodiment of the present disclosure.

FIG. 2 is a flowchart for describing a best view spot providing method of the best view spot generating system 10 (refer to FIG. 1) according to an embodiment of the present disclosure.

In operation S110, the best view spot generating system 10 may generate a best view spot associated with a three-dimensional observation target included in a virtual space that is provided to the user. The number of best view spots that are generated from the best view spot generating system 10 may be one or more. In the case where a plurality of best view spots are generated, the best view spot generating system 10 may determine a best view spot based on priorities of the generated best view spots without a separate control of the user. Alternatively, the best view spot generating system 10 may provide best-view-spot candidates to the user and may determine a best view spot based on selection of the user. How to generate a best view spot will be described in detail with reference to FIG. 3.

In operation S120, the best view spot generating system 10 may visualize a best view associated with the three-dimensional observation target in the virtual space provided to the user, based on the best view spot generated in operation S110. How to visualize a best view will be described in detail with reference to FIG. 6.

Figure 3:
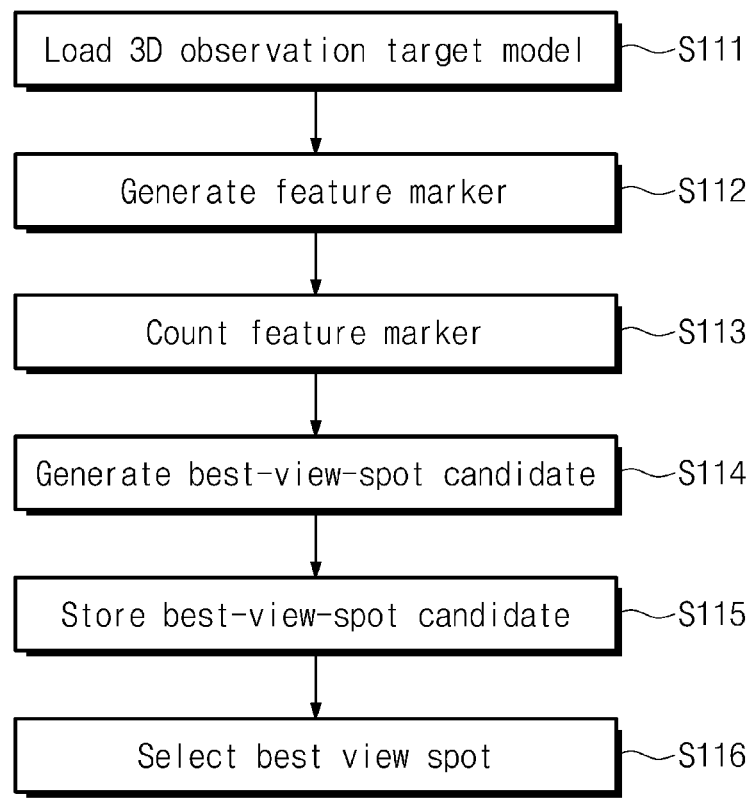
FIG. 3 is a flowchart for describing a best view spot generating process according to an embodiment of the present disclosure.

FIG. 3 is a flowchart for describing a best view spot generating process according to an embodiment of the present disclosure.

In operation S111, the best view spot generating system 10 (refer to FIG. 1) according to an embodiment of the present disclosure may load a three-dimensional observation target model on a virtual space to be provided to the user terminal 100 (refer to FIG. 1). The number of three-dimensional observation target models may be one or more. In the case where a plurality of three-dimensional observation target models are loaded, all the following operations may be performed with respect to each of the plurality of three-dimensional observation target models.

In operation S112, the best view spot generating system 10 according to an embodiment of the present disclosure may generate a feature marker associated with the loaded three-dimensional observation target model. The feature marker may refer to an indicator disposed on the surface of the three-dimensional observation target and may be disposed on a portion having a prominent feature of the three-dimensional observation target. As an example, the feature marker may include a corner, an edge, or a protrusion of the three-dimensional observation target. A way to generate a feature marker, which is described in operation S112, will be described in detail with reference to FIG. 4.

In operation S113, the best view spot generating system 10 according to an embodiment of the present disclosure may count feature markers at sample spots. In detail, the best view spot generating system 10 may dispose a bounding hemi-sphere capable of fully including the three-dimensional observation target and may then dispose the sample spots on the surface of the bounding hemi-sphere. The sample spots may be distributed and disposed at regular intervals. The best view spot generating system 10 may dispose virtual cameras at all the sample spots and may count the number of feature markers that are fully viewed from the virtual camera disposed at each sample spot. A way to count feature markers, which are described in operation S113, will be described in detail with reference to FIG. 5.

In operation S114, the best view spot generating system 10 according to an embodiment of the present disclosure may generate a best-view-spot candidate based on a result of operation S113. As the number of counted feature markers of an arbitrary sample spot increases, the arbitrary sample spot may be selected as a candidate having the high probability of becoming a best view spot. Alternatively, sample spots in which the number of counted feature markers is a threshold value or more may be selected as a best-view-spot candidate.

In operation S115, the best view spot generating system 10 according to an embodiment of the present disclosure may store the best-view-spot candidate generated in operation S114 in the database 300 (refer to FIG. 1). As an example, a best-view-spot candidate that is stored in the database 300 may be stored in the form of a priority-based list.

In operation S116, the best view spot generating system 10 according to an embodiment of the present disclosure may select a best view spot. The best view spot generating system 10 may select a best view spot based on priorities of the generated best view spots without a separate control of the user. Alternatively, the best view spot generating system 10 may provide best-view-spot candidates to the user and may determine a best view spot based on selection of the user.

Figure 4:
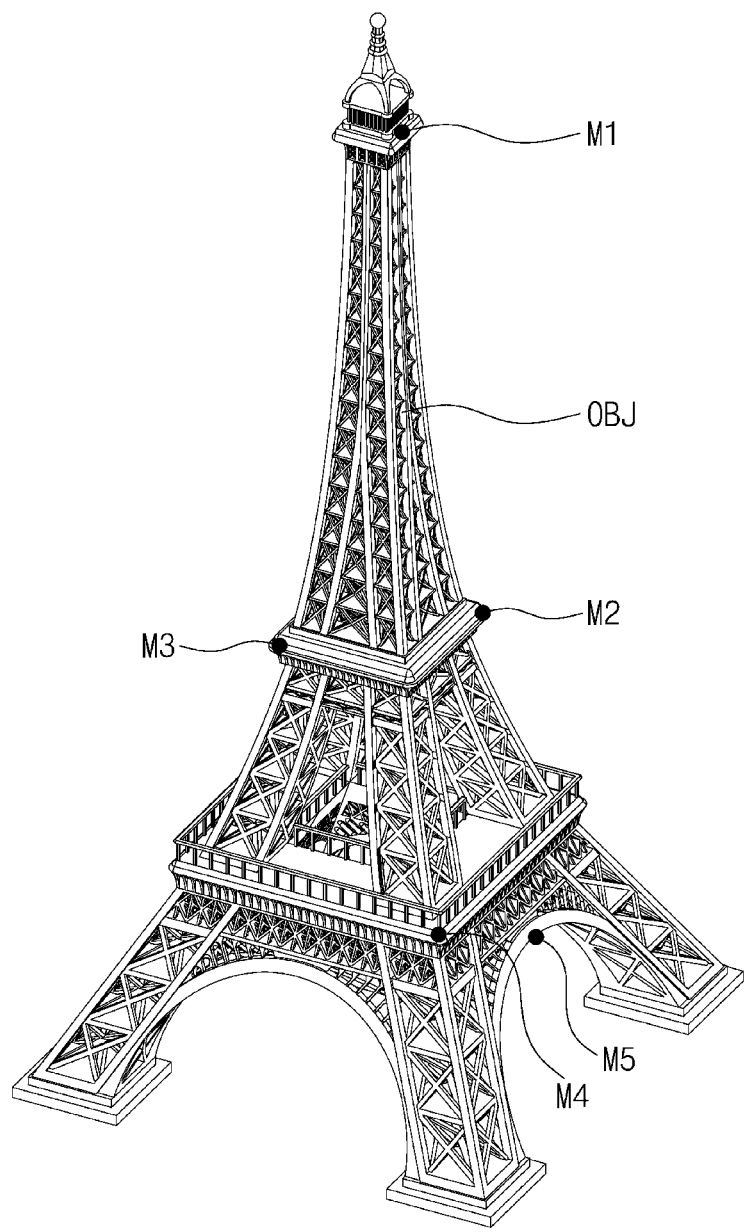
FIG. 4 is a diagram for describing how a feature marker is generated in a best view spot generating process according to an embodiment of the present disclosure.

FIG. 4 is a diagram for describing how a feature marker is generated in a best view spot generating process according to an embodiment of the present disclosure. Referring to FIG. 4, it may be understood that first to fifth feature markers M1 to M5 associated with portions where prominent features are present are generated on the surface of a three-dimensional observation target OBJ. An example in which 5 feature markers M1 to M5 are generated is illustrated in FIG. 4, but this is only for convenience of description and illustration. The number of feature markers to be generated is not limited. In the best view spot generating process, a feature marker may be generated by the best view spot generating system 10 (refer to FIG. 1) according to an embodiment of the present disclosure, but the user may adjust or remove a location of a feature marker and may add a feature marker at a desired location.

Figure 5:
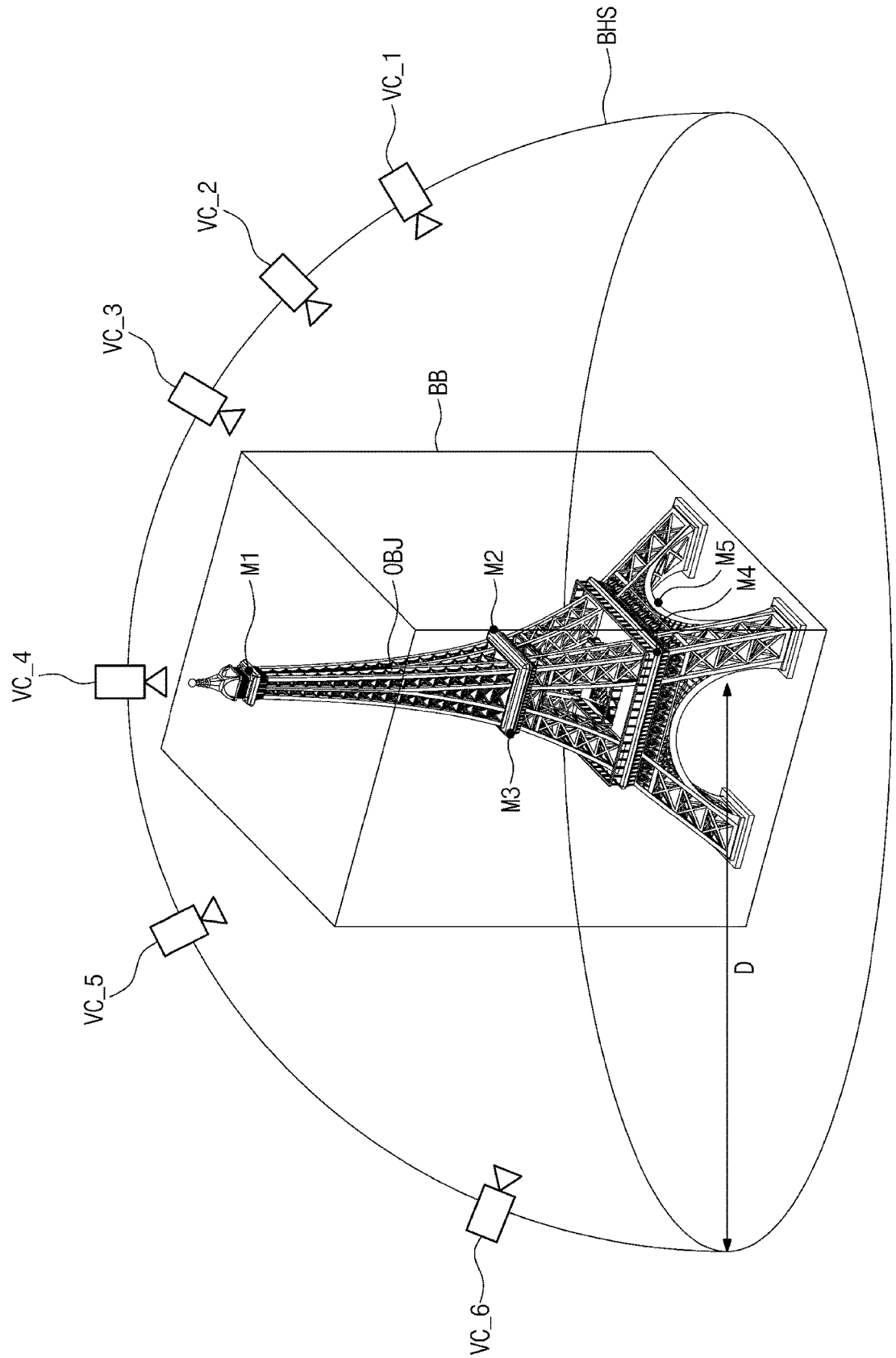
FIG. 5 is a diagram for describing how to count a feature marker in a best view spot generating process according to an embodiment of the present disclosure.

FIG. 5 is a diagram for describing how to count a feature marker in a best view spot generating process according to an embodiment of the present disclosure. Referring to FIG. 5, the best view spot generating system 10 (refer to FIG. 1) may dispose a the bounding hemi-sphere BHS capable of fully including the three-dimensional observation target OBJ, may dispose sample spots on the surface of the bounding hemi-sphere BHS, and may dispose virtual cameras VC_1 to VC_6 at the sample spots. A radius "D" of the bounding hemi-sphere BHS may be adjusted by the user. Also, the center of the bounding hemi-sphere BHS may be disposed at the same location as the center of a bounding box BB. The bounding box BB refers a rectangular parallelepiped of a minimum size including the three-dimensional observation target OBJ.

An example in which sample spots are randomly disposed on the surface of the bounding hemi-sphere BHS is illustrated in FIG. 5, but this is only for convenience of description and illustration. Sample spots may be distributed on the whole surface of the bounding hemi-sphere BHS at regular intervals. Also, the number of sample spots may increase or decrease. As an interval between sample spots decreases, the number of best-view-spot candidates to be generated may increase; as an interval between sample spots increases, the number of best-view-spot candidates to be generated may decrease or may not exist.

An example in which 6 virtual cameras VC_1 to VC_6 are disposed is illustrated in FIG. 5, but this is only for convenience of description and illustration. The number of virtual cameras to be disposed is not limited. Virtual cameras may be respectively disposed at all sample spots generated on the surface of the bounding hemi-sphere BHS. The virtual cameras may be respectively disposed at all the sample spots so as to face the center of the bounding box BB of the three-dimensional observation target OBJ. Also, a field of view of a virtual camera may be adjusted such that the bounding box BB of the three-dimensional observation target is well viewed on a screen of the virtual camera.

In one embodiment illustrated in FIG. 5, the first feature marker M1, the second feature marker M2, the third feature marker M3, and the fourth feature marker M4 may be viewed through the first virtual camera VC_1 disposed at a first sample spot and the second virtual camera VC_2 disposed at a second sample spot and the third virtual camera VC_3 disposed at a third sample spot, and the number of counts of each of the first virtual camera VC_1, the second virtual camera VC_2, and the third virtual camera VC_3 may be determined as "4". The first feature marker M1, the second feature marker M2, and the third feature marker M3 may be viewed through the fourth virtual camera VC_4 disposed at a fourth sample spot, and the number of counts of the fourth virtual camera VC_4 may be determined as "3".

The first feature marker M1 and the third feature marker M3 may be viewed through the fifth virtual camera VC_5 disposed at a fifth sample spot, and the number of counts of the fifth virtual camera VC_5 may be determined as "2". The third feature marker M3 may be viewed through the sixth virtual camera VC_6 disposed at a sixth sample spot, and the number of counts of the sixth virtual camera VC_6 may be determined as "1".

The best view spot generating system 10 may generate a best-view-spot candidate based on the number of counts of the first to sixth virtual cameras VC_1 to VC_6. As an example, the best view spot generating system 10 may give a priority of a best-view-spot candidate in order from the largest count value to the smallest count value. Alternatively, in the case where a threshold value of the best view spot generating system 10 is set to a count value of "3", the first to fourth sample spots in which a count value is 3 or more may be included as a best-view-spot candidate.

The best view spot generating system 10 may select a best view spot based on priorities of the generated best view spots without a separate control of the user. Alternatively, the best view spot generating system 10 may provide best-view-spot candidates to the user and may determine a best view spot based on selection of the user.

Figure 6:
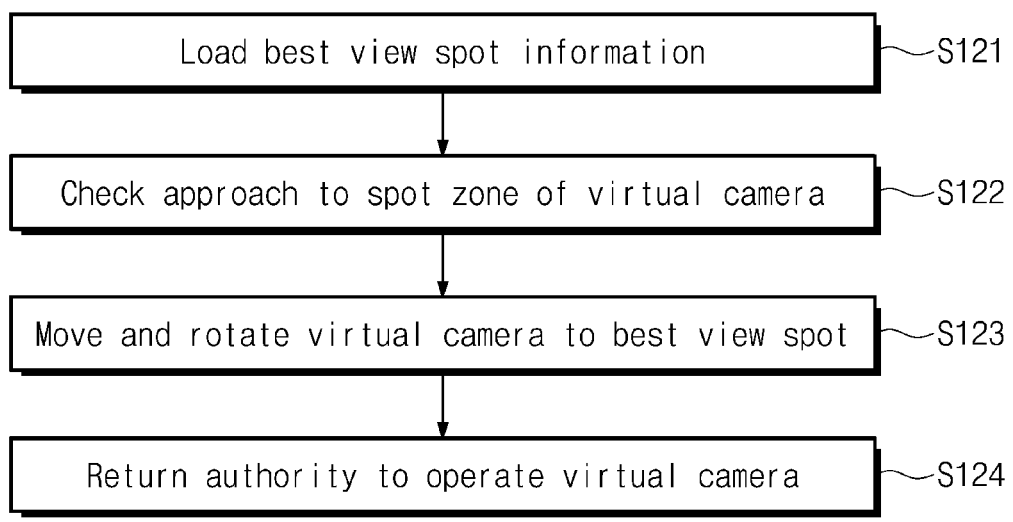
FIG. 6 is a flowchart for describing a best view spot visualizing process according to an embodiment of the present disclosure.

FIG. 6 is a flowchart for describing a best view spot visualizing process according to an embodiment of the present disclosure.

In operation S121, the best view spot generating system 10 (refer to FIG. 1) according to an embodiment of the present disclosure may load information about the selected best view spot. As an example, the information about the best view spot may include information about a location, a direction, a field of view, and the like of a camera disposed at a sample spot.

In operation S122, the best view spot generating system 10 according to an embodiment of the present disclosure may check whether a virtual camera operated by the user approaches a spot zone. The spot zone refers to a region of the bounding hemi-sphere BHS (refer to FIG. 5) surrounding a three-dimensional observation target and may include an error range.

When it is checked that the virtual camera operated by the user approaches the spot zone, in operation S123, the best view spot generating system 10 according to an embodiment of the present disclosure may obtain the authority to operate the virtual camera from the user and may move and rotate the virtual camera. The rotation and movement of the virtual camera may be controlled by best view spot information.

In operation S124, the best view spot generating system 10 according to an embodiment of the present disclosure may return the authority to operate the virtual camera to the user after the viewing at the best view spot ends. Accordingly, the user may operate a virtual camera arbitrarily and may view a virtual space.

Figure 7:
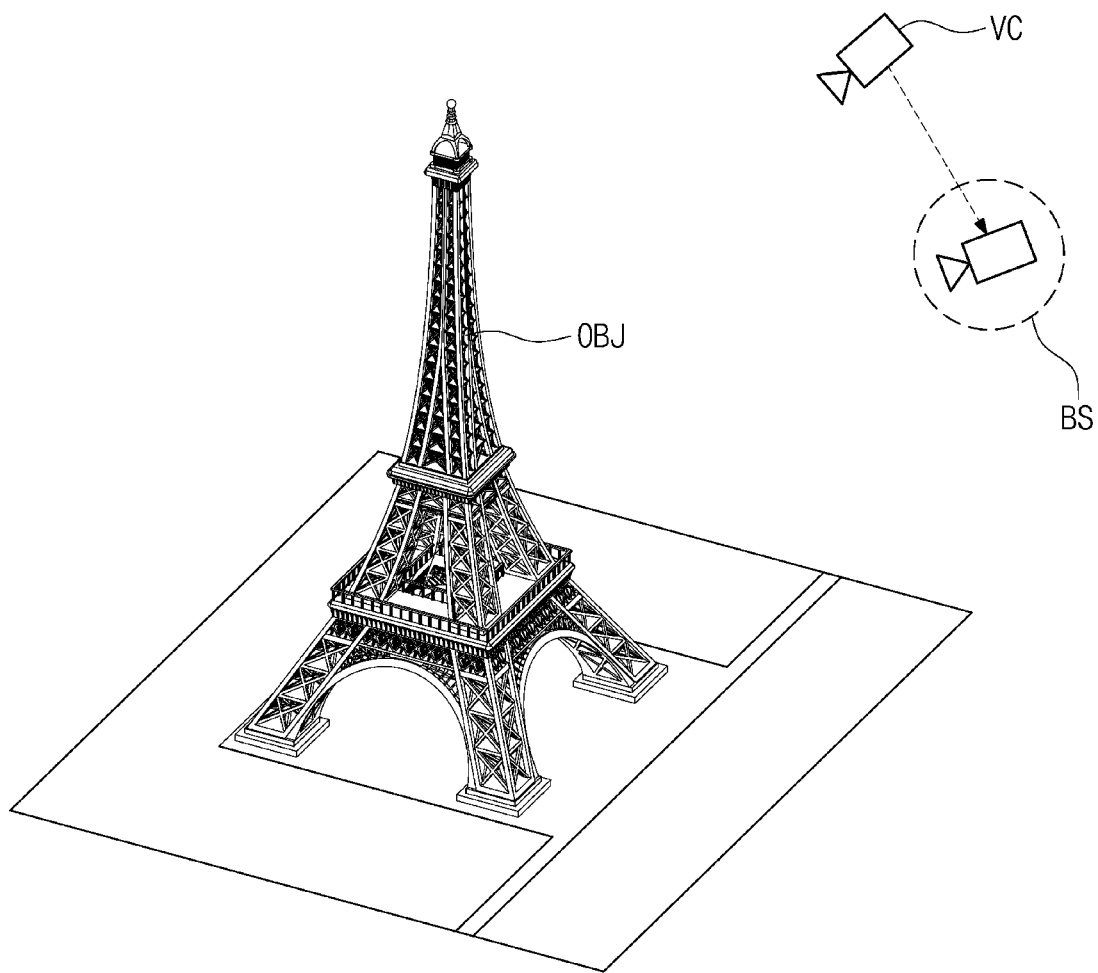
FIG. 7 is a diagram illustrating a best view spot visualizing operation performed in a best view spot generating system according to an embodiment of the present disclosure.

FIG. 7 is a diagram illustrating a best view spot visualizing operation performed in the best view spot generating system 10 (refer to FIG. 1) according to an embodiment of the present disclosure. In FIG. 7, the best view spot generating system 10 may check that a virtual camera VC approaches a spot zone by the operation of the user and may obtain the authority to operate the virtual camera VC. The best view spot generating system 10 may move and rotate the virtual camera VC to a best view spot BS, at which the viewing of a three-dimensional observation target is easy, based on best view spot information.

According to the present disclosure, a server and a method for generating a best view spot may make it possible to generate a best view spot more quickly and for the user to approach a best view spot without a separate control.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A best view spot generating server comprising:
   a virtual tour providing server configured to communicate with a user terminal over a network and to generate a best view spot associated with a three-dimensional object included in a virtual space; and
   a database configured to operate in conjunction with the virtual tour providing server and to store data associated with the virtual space, data associated with the three-dimensional object, and data associated with the best view spot, wherein:
   the best view spot is generated based on feature makers generated at feature portions of the three-dimensional object,
   the virtual tour providing server is configured to:
      dispose sample spots relative to the three-dimensional object; and
      determine best-view-spot candidates based on a number of the feature markers,
      which are counted using virtual cameras disposed at the sample spots, and
   as the number of the feature markers counted using the virtual cameras disposed at the sample spots increases, the virtual tour providing server give priorities of the best-view-spot candidates to the sample spots.

2. The best view spot generating server of claim 1, wherein the virtual tour providing server is configured to:
   form a bounding hemi-sphere including the three-dimensional object; and
   dispose the sample spots on the bounding hemi-sphere.

3. The best view spot generating server of claim 2, wherein, when the number of the feature markers counted using the virtual cameras disposed at the sample spots is greater than or equal to a threshold value, the feature markers are included in the best-view-spot candidates.

4. The best view spot generating server of claim 1, wherein the virtual tour providing server provides the user terminal with a best view visualized with respect to the three-dimensional object, based on information associated with the best-view-spot candidates.

5. The best view spot generating server of claim 1, wherein the virtual tour providing server provides the user terminal with a best view visualized with respect to the three-dimensional object, based on information associated with a best-view-spot candidate selected by a user from the best-view-spot candidates.

6. A best view spot generating method of a system which provides a virtual tour associated with a virtual space including a three-dimensional object, the method comprising:
   loading a three-dimensional object model;
   generating feature markers based on a feature of the three-dimensional object model;
   counting a number of feature markers viewed from each of a plurality of sample spots, the plurality of sample spots being disposed on a bounding hemi-sphere disposed to include the three-dimensional object model;
   generating best-view-spot candidates based on the number of feature markers thus counted; and selecting a best view spot from the generated best-view-spot candidates,
wherein as the number of the feature markers counted at the plurality of sample spots includes, the method gives priorities of the best-view-spot candidates to the sample spots.

7. The method of claim 6, further comprising:
storing information associated with the generated best-view-spot candidates.

8. The method of claim 6, wherein the plurality of sample spots are disposed on the bounding hemi-sphere at regular intervals.

9. The method of claim 6, further comprising:
visualizing a best view associated with the three-dimensional object based on the selected best view spot.

10. The method of claim 9, wherein the visualizing of the best view associated with the three-dimensional object includes:
loading information associated with the selected best view spot;
checking whether a virtual camera operated by a user approaches a spot zone; and
moving and rotating the virtual camera based on the information associated with the selected best view spot.

11. The method of claim 10, wherein, when the virtual camera approaches the spot zone, the system obtains an authority to control the virtual camera.

12. The method of claim 11, further comprising:
returning the authority to control the virtual camera, after the movement and rotation of the virtual camera based on the information associated with the selected best view spot is completed.

* * * * *

UNITED STATES PATENT AND TRADEMARK OFFICE
CERTIFICATE OF CORRECTION

| | |
|---|---|
| PATENT NO. | : 11,847,746 B2 |
| APPLICATION NO. | : 17/540517 |
| DATED | : December 19, 2023 |
| INVENTOR(S) | : Kyung Kyu Kang and Chang Joon Park |

It is certified that error appears in the above-identified patent and that said Letters Patent is hereby corrected as shown below:

On the Title Page

Include the following foreign application priority data:
(30) Foreign Application Priority Data
Dec. 3, 2020 (KR) 1020200167740
Apr. 15, 2021 (KR) 1020210049237

Signed and Sealed this
Twelfth Day of March, 2024

Katherine Kelly Vidal
*Director of the United States Patent and Trademark Office*